United States Patent Office 2,961,202
Patented Nov. 22, 1960

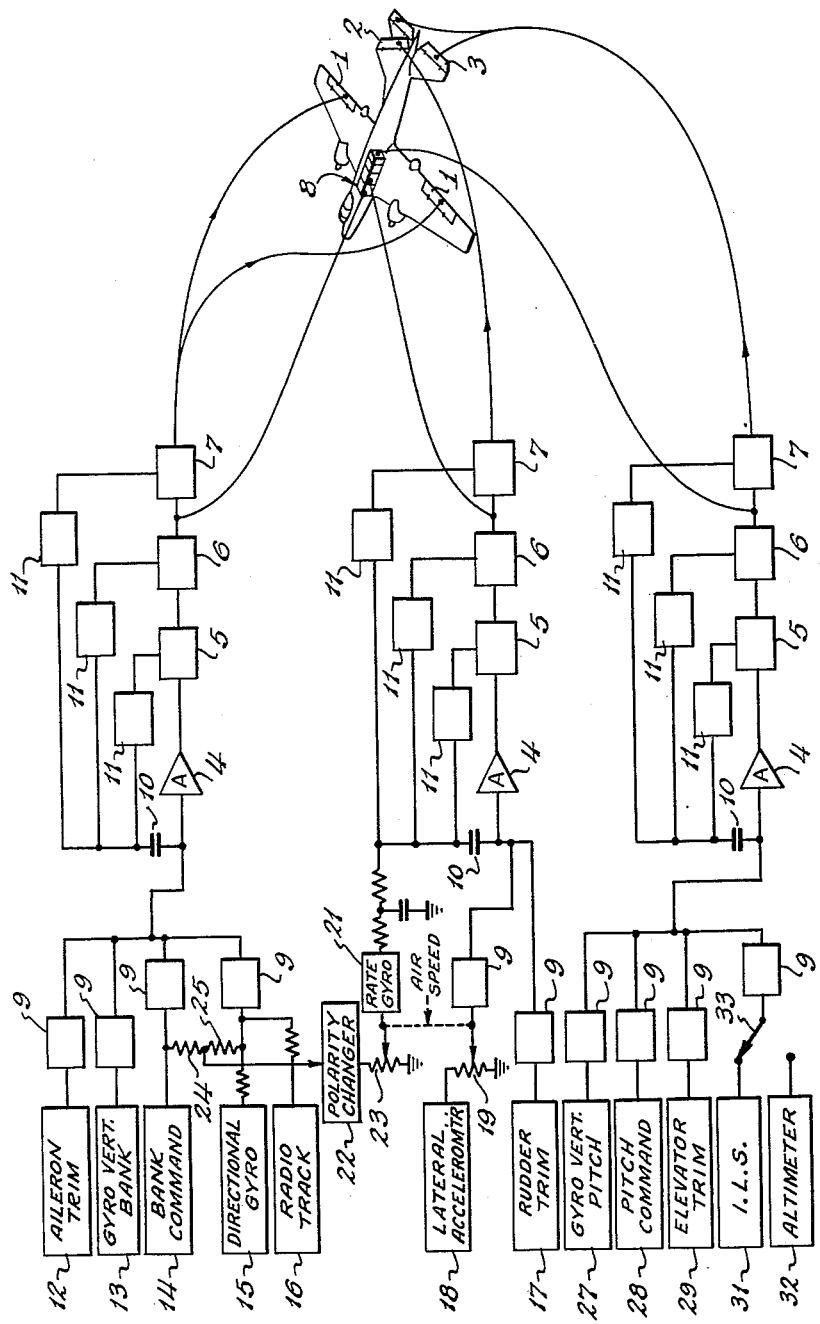

2,961,202
AIRCRAFT AUTOMATIC CONTROL SYSTEM

Frederick Arthur Summerlin, Isleworth, England, assignor to The Sperry Gyroscope Company Limited, Brentford, England, a company of Great Britain Filed Jan. 31, 1958, Ser. No. 712,533

Claims priority, application Great Britain Feb. 19, 1957

6 Claims. (Cl. 244—77)

This invention relates to aircraft control apparatus.

According to the invention there is provided aircraft control including control apparatus coupled to supply an electrical control signal to an aileron servomotor control channel to set a bank angle to be adopted by the aircraft in order to cause the aircraft to turn in azimuth, a rate-of-turn gyroscope arranged to generate, and to supply to a rudder servomotor control channel, an electrical signal proportional to the rate-of-turn of the aircraft about its yaw axis, and a circuit, coupled between the control apparatus and the rudder servomotor control channel to receive the control signal as an input, arranged to supply to the rudder servomotor control channel in opposition to the rate-of-turn signal produced in response to a turn of the aircraft about its yaw axis in consequence of a bank angle ordered by the control apparatus, a signal compensating, or partly compensating for such rate-of-turn signal.

The control apparatus may be a controlling instrument such as a directional gyroscope which automatically produces a signal in response to departure of the aircraft from a defined heading, this heading-deviation signal being supplied as the control signal to the aileron servomotor control channel. Means may be associated with the directional gyroscope for enabling a desired change of course to be effected through any desired angle. Desired rates of turn may be produced by operation of a manually-controlled device to produce a control signal, the controlling instrument being rendered ineffective.

Preferably one of the control and compensating signals is modified in dependence on the airspeed of the aircraft since a given bank angle produces different rates of turn at different airspeeds.

Preferably also a bank-angle-responsive device, such as a gyro vertical, is provided to generate a signal proportional to the bank angle of the aircraft and to supply the signal to the aileron servomotor control channel in opposition to the control signal. Preferably also limit means is provided for the control signal. As a result the aircraft is caused to bank through an angle substantialy proportional to the control signal if the control signal has a magnitude within the limits defined by the limiting means but assumes a constant bank angle corresponding to the limited control signal for a control signal greater than the limiting value.

In one form of the invention, the rate-of-turn signal and the compensating signal are coupled to the rudder servomotor control channel through a circuit including a capacitor or equivalent element, arranged such that the output of the circuit, due to any difference between the rate-of-turn signal and the compensating signal decays with time, so that even if the two signals are not matched a permanent deflection of the rudder will not be produced as a result of such mismatch.

The invention may be carried into practice in various ways and will be described by way of example as embodied in an automatic pilot for an aircraft, with reference to the accompanying drawing in which the single figure is a schematic diagram of the automatic pilot.

*General description*

The aircraft has conventional control surfaces i.e., ailerons 1, rudder 2, and elevators 3. Each of these sets of control surfaces can be actuated through its own control channel which consists of a D.C. electronic amplifier 4, a reversible clutch 5 excited by the output from the amplifier 4, a hydraulic servo motor 6 whose pilot valve is driven through the clutch 5, when it is engaged by a continuously running motor (not shown) in a direction dependent on the sign of the amplifier output, and a hydraulic power servo motor 7.

The input to each of the amplifiers 4 in the three control channels is derived from a number of sources of control signals some of which are for setting command signals into the control channels to carry out a manoeuvre or correction and others of which are for setting in error signals due to deviations of the aircraft from a set heading or attitude detected by instruments of the aircraft.

Command signals can be set in automatically, for example, from heading or track-defining instruments while they can also be set in by use of the instruments controlled manually by the pilot. The pilot can also operate the pilot valves of the power servomotor 7 directly from control units 8 in the cockpit.

*The control channels*

*Command and error signals.*—The various command and error signals that can be fed to the input of each amplifier 4, which will be described in more detail below in connection with the individual channels, are all connected through high impedances 9, or through networks having a high transfer impedance, to the live input terminal of the amplifier 4. The other input terminal of the amplifier is grounded and each of the command signals is derived from a source having one grounded terminal to complete the circuit.

*Feed-back signals.*—The output from the clutch 5, the servo motor 6 and the power servo motor 7 in each control channel is fed back negatively to the live input terminal of the amplifier 4 through a common capacitor 10. This arrangement ensures that the amplifier will have a low input impedance to D.C. input signals as is described in British patent specification No. 690,982. The feedback path from each of the clutch, servo motor, and power servo motor, includes a correcting network 11 designed to introduce corrections for frequency-dependent effects due to non-linearity or other characteristics in the operation of the clutch, the servo motor, and the power servo motor respectively.

The combination of the low input impedance of the amplifier 4 with the high impedance in each of the parallel paths from the sources of command and error signals to the amplifier input ensures that each command and error signal at the input to the amplifier is dependent substantially only on the voltage of the source of the signal and the transfer impedance of its connection to the amplifier input. Each control channel is arranged so that the overall control of the respective control surfaces of the aircraft approximates to the sum of two quantities, one of which is proportional to the total input signal (other than the feed-back signals), and the other to the time integral of this total input signal. The integration results from the series capacitor 10 in the feedback path.

*Aileron control channel*

The sources of command and error signals in the aileron control channel include a roll trim potentiometer 12 which is used merely for setting in a roll trimming signal; a horizon gyro unit 13 which is used to set in an error signal dependent upon the actual bank angle of the aircraft: a pilot's manually controlled device 14 by which the pilot can set in a bank command signal to produce a corresponding turn in azimuth: a directional gyro 15 from which is derived a steering command signal corresponding to any change in the heading of the aircraft from a set heading: and a track displacement signal generating unit 16 from which command signals can be obtained which represent displacement from a track or course to be followed, for example a radio defined course.

During automatic operation when the trim potentiometer 12 has been set, any rolling of the aircraft due to a disturbance will be detected by the horizon gyro unit 13 and will produce an error or counter signal in the control channel, while the aircraft can be controlled to follow a desired heading or desired course by use of the steering signal derived from one or both of the directional gyro 15 and the track signal generating unit 16. It will be appreciated that when a command turn is to be executed and a steering control signal is generated, say by the directional gyro 15, once the aircraft starts to bank, a bank error signal from the horizon gyro unit 13 will be supplied in opposition to the input of the amplifier 4 so that the net input will be zero when the aircraft is correctly banked. The bank will persist in decreasing amount until the steering signal reduces to zero, the opposing bank signal gradually restoring the aircraft to level flight. The channel includes means (not shown) ensuring that the maximum bank angle that can be set in is an angle of 30° (or of 5° when the aircraft is flying along a glide path towards an airfield) so that a large change of course to a new heading can be effected by turning the pick-off of a compass device to produce a heading error signal of any magnitude for the turn towards the new heading which will be effected at the limited angle of bank and not at the angle corresponding to the large turn. The bank angle will remain constant at the limited value until the aircraft approaches the new heading.

*Rudder control channel*

The rudder control channel differs from the aileron control channel in the nature of the command and error signals that can be set in. Thus the channel includes a yaw trim potentiometer 17 corresponding to the roll trim potentiometer 12, and a lateral accelerometer 18 for supplying a signal to the rudder amplifier 4 proportional to the lateral acceleration, to oppose any side slip of the aircraft.

This signal is supplied through a potentiometer 19 whose setting is controlled automatically in dependence on air speed.

When the aircraft is turning, the input to the amplifier 4 in the rudder control channel will also include a rate-of-turn signal derived from a rate gyro 21 and fed to the amplifier through the feedback capacitor 10. This rate-of-turn-signal is used to stabilise the aircraft against oscillations about its yaw axis.

This rate-of-turn signal is combined with a compensating signal derived from a steering control signal which is supplied through a polarity changer 22 and an airspeed adjusted potentiometer 23. The compensating signal balances the rate-of-turn signal produced in consequence of the steering signal whether this steering signal was produced automatically by the directional gyro 15 or the track signal generating unit 16, or produced under manual control from the pilot's roll potentiometer 14. Thus, the input to the polarity changer 22 is connected to the junction of two resistors 24 and 25 connected between the live lines from the directional gyro 15 and the pilot's roll potentiometer 14. The rate-of-turn produced by a given angle of bank is itself dependent on airspeed and this is allowed for in the airspeed adjusted potentiometer 23. In other words the rudder control channel will only receive an effective rate-of-turn signal if the turn has not been in consequence of a steering demand signal from one of the units 14, 15 and 16.

By connecting the rate-of-turn signal from the rate gyro 21 to the input of the amplifier 4 through the feedback capacitor 10 (or indeed through any other capacitor) any difference between the compensating signal and the actual rate-of-turn signal produced in response to a steering signal, which produces a mismatch or control signal on the rudder, decays with time so that on a long term basis for example, in a turn through a considerable angle to a new heading, the steady state rudder deflection is that defined by the lateral accelerometer 18 or the steady state component of the lateral acceleration signal.

*Elevator control channel*

Command and error signals can be set in the elevator control channel from a horizon gyro unit 27 for generating a pitch error signal, a pilot's pitch potentiometer 28 by which the pilot can generate a pitch command signal, a pitch trim potentiometer 29 which corresponds to the roll and yaw trim potentiometers 12 and 17, instrument landing system equipment 31 for generating a glide path signal, and an altimeter 32 for generating an altitude control signal. The two-way switch 33 allows either of these latter signals to be selected for connection to the amplifier 4.

*Summary of operation*

When the aircraft is being controlled automatically the horizon gyro unit 13, directional gyro 15, rate gyro 21, lateral accelerometer 18, and horizon gyro unit 27, will automatically compensate for disturbances of the aircraft from its straight and level flight, while any command changes of course can be effected by means of the directional gyro 15 or the track signal generating unit 16, and any variations in altitude by use of the altimeter 32. Changes in altitude can be produced by operation of the pitch potentiometer 28 to effect a change of altitude. During command turns effected through the manually-controlled device 14 the directional gyro 15 and the track signal generating unit 16 will be rendered ineffective, but the rate gyro 21 will be maintained in circuit to provide a stabilising or damping control on the rudder, opposing yawing movements due to external disturbances and any tendency to oscillate about the yaw axis. Of course in this mode of operation any command turn produced by the roll potentiometer 14 will also produce a compensating signal in the rudder control channel in opposition to the consequential rate-of-turn signal from the rate gyro 21.

What is claimed is:

1. An aircraft control system comprising an aileron control channel, a rudder control channel, command signal generating means for generating a bank command signal, means coupling said command signal generating means to said aileron control channel to thereby cause the aircraft to turn in azimuth in accordance with said bank command signal, means responsive to the rate-of-turn of the aircraft about its yaw axis for providing a signal proportional thereto, means coupling said rate-of-turn means to said rudder control channel, means responsive to the airspeed of the aircraft for providing a signal proportional thereto, means coupled to be responsive to said bank command signal and said airspeed signal for providing a compensating signal in accordance with the rate-of-turn defined thereby, means coupled to be responsive to said compensating signal and said rate-of-turn signal for providing a control signal to said rudder control channel in accordance with the difference therebetween, and means connected to said rudder control channel and responsive to said control signal for reducing the effectiveness of said control signal with time.

2. A system of the character described in claim 1 including means responsive to the lateral acceleration of the aircraft and connected to provide a signal in accordance therewith to said rudder control channel.

3. An aircraft control system comprising an aileron control channel, a rudder control channel, signal generating means for generating a signal to command a bank angle of the aircraft, said signal generating means being coupled to said aileron control channel, yaw rate-of-turn responsive means for providing a signal proportional thereto, airspeed responsive means for providing a signal proportional thereto, means coupled to be responsive to the bank command signal and the airspeed signal for providing a compensating signal in accordance with the rate-of-turn defined thereby, means coupled to be responsive to the compensating signal and the yaw rate signal for providing a control signal to said rudder control channel in accordance with the difference therebetween whereby the compensating signal tends to render the actual yaw rate signal ineffective during a commanded turn except for damping purposes, and means connected to be responsive to said control signal for causing said control signal to decay with respect to time.

4. A system of the character described in claim 3 including means responsive to the lateral accelerations of the aircraft and connected to supply a signal proportional thereto to the rudder control channel.

5. A system of the character described in claim 4 including means connected to said acceleration responsive means for modifying said acceleration signal in accordance with airspeed.

6. A system of the character described in claim 3 including miscoordination responsive means for supplying a signal to the rudder control channel proportional to an error in the angle of bank with respect to the rate of turn resulting in side slip at a given airspeed during said turn whereby yaw rate responsive means provides short-term yaw damping while the miscoordination responsive means provides long-term miscoordination correction.

References Cited in the file of this patent
UNITED STATES PATENTS

| | | |
|---|---|---|
| 2,621,003 | Meredith | Dec. 9, 1952 |
| 2,827,249 | Glaus | Mar. 18, 1958 |
| 2,827,250 | Rusler | Mar. 18, 1958 |